(12) United States Patent
Chen et al.

(10) Patent No.: US 12,451,688 B2
(45) Date of Patent: Oct. 21, 2025

(54) LINKAGE MECHANISM, BASE, AND SURGE PROTECTION DEVICE

(71) Applicant: Shanghai Chenzhu Instrument Co., Ltd., Shanghai (CN)

(72) Inventors: Keqi Chen, Shanghai (CN); Zhenhui Liu, Shanghai (CN)

(73) Assignee: SHANGHAI CHENZHU INSTRUMENT CO., LTD., Shanghai (CN)

( * ) Notice: Subject to any disclaimer, the term of this patent is extended or adjusted under 35 U.S.C. 154(b) by 135 days.

(21) Appl. No.: 18/288,982

(22) PCT Filed: Apr. 30, 2021

(86) PCT No.: PCT/CN2021/091301
§ 371 (c)(1),
(2) Date: Oct. 30, 2023

(87) PCT Pub. No.: WO2022/226959
PCT Pub. Date: Nov. 3, 2022

(65) Prior Publication Data
US 2024/0222966 A1    Jul. 4, 2024

(51) Int. Cl.
*H02H 9/04* (2006.01)
*H01H 3/46* (2006.01)
(Continued)

(52) U.S. Cl.
CPC .............. *H02H 9/049* (2013.01); *H01H 3/46* (2013.01); *H01H 71/025* (2013.01); *H01H 83/10* (2013.01)

(58) Field of Classification Search
CPC ............ H02H 9/049; H02H 9/04; H01H 3/46; H01H 71/025; H01H 83/10;
(Continued)

(56) References Cited

U.S. PATENT DOCUMENTS 10,121,615 B1 * 11/2018 Wu ........................ H01H 71/02
11,735,890 B2 * 8/2023 Strangfeld ................ H01T 1/14
361/118
(Continued)

FOREIGN PATENT DOCUMENTS

CN          101599640 A       12/2009
CN          101752856 A  *     6/2010
(Continued)

OTHER PUBLICATIONS

International Application Serial No. PCT/CN2021/091301, International Search Report mailed Jan. 26, 2022, 6 pgs.

*Primary Examiner* — Dharti H Patel

(57) ABSTRACT

Disclosed in the present invention are a linkage mechanism, a base, and a surge protection device. The linkage mechanism comprises a linkage swing rod and transmission components, wherein the linkage swing rod is arranged to be rotatably connected, and is provided with a trigger portion capable of triggering a switch when rotating and at least two stress portions arranged spaced apart from each other on one side of an axis of rotation of the linkage swing rod; one transmission component is arranged corresponding to each of the stress portions; and the transmission components are arranged in such a way that any of the transmission components applies a pushing force to the stress portion to rotate the linkage swing rod, and thus the trigger portion triggers the switch. According to the surge protecting device using the linkage mechanism provided in the present invention, a module failure signal can be sent out when any surge protection module fails under the condition where only one microswitch is arranged, which not only simplifies the structure of the surge protecting device and reduces the volume, but also reduces the cost.

7 Claims, 11 Drawing Sheets

(51) Int. Cl.
*H01H 71/02* (2006.01)
*H01H 83/10* (2006.01)

(58) Field of Classification Search
CPC .......... H01H 2071/044; H01H 9/0066; H01H 71/04; H01H 85/306; H01H 9/32; H01H 71/465; H01H 37/08; H01H 2037/762; H01H 37/761
USPC ......................................................... 361/118
See application file for complete search history.

(56) References Cited

U.S. PATENT DOCUMENTS

| | | | | |
|---|---|---|---|---|
| 2006/0044729 | A1* | 3/2006 | Domejean | H02H 9/042 361/118 |
| 2018/0374666 | A1* | 12/2018 | Zhai | H01C 7/12 |
| 2021/0126447 | A1* | 4/2021 | Miller | H01H 71/58 |

FOREIGN PATENT DOCUMENTS

| | | | | | |
|---|---|---|---|---|---|
| CN | 201716825 | U | | 1/2011 | |
| CN | 203165599 | U | | 8/2013 | |
| CN | 206819955 | U | * | 12/2017 | |
| CN | 207199547 | U | | 4/2018 | |
| CN | 108364836 | A | * | 8/2018 | ............... H02H 9/04 |
| CN | 108878086 | A | * | 11/2018 | ............... H01H 37/08 |
| CN | 108962699 | A | | 12/2018 | |
| CN | 111933370 | A | * | 11/2020 | ............... H01C 1/02 |
| CN | 212304744 | U | * | 1/2021 | |
| DE | 102020107318 | B4 | * | 6/2023 | ............... H01H 9/32 |

* cited by examiner

LINKAGE MECHANISM, BASE, AND SURGE PROTECTION DEVICE

This application is a U.S. National Stage Filing under 35 U.S.C. 371 from International Application No. PCT/CN2021/091301, filed on Jun. 30, 2021, and published as WO 2022/226959 A1 on Nov. 3, 2022, which is incorporated by reference herein in its entirety.

TECHNICAL FIELD

The present disclosure relates to the technical field of overvoltage and over-current protection, in particular to a linkage mechanism, a base, and a surge protecting device.

BACKGROUND

Thunder and lightning are one of the top ten natural disasters. As technologies advance, devices are becoming smarter and more integrated, and are becoming more sensitive to transient overvoltage—surges caused by thunder and lightning. In addition, startup and shutdown of high-power equipment can generate surges. Surge protectors (or surge protecting devices) can prevent surges from damaging the equipment, and are widely applied in communications, construction, rail transit, electric power, new energy, petrochemical industry, and other industries. When peak currents or voltages are generated in electrical circuit lines because of lightning strike or external interference, the surge protectors can conduct in a very short period of time, discharge the currents, and limit the voltages to a lower level, thereby avoiding surge damage to other equipment in circuits.

A surge protector for a power distribution system includes a surge protecting module and a base, the surge protecting module is plugged into the base and provided with a piezoresistor to be welded to a circuit, the piezoresistor has a very large resistance in normal operation, which is equivalent to a disconnected state, while the resistance of the piezoresistor drops sharply when a voltage in the circuit exceeds a predetermined value, and the piezoresistor is in a conductive state, and can discharge a large quantity of currents and limit the level of overvoltage. However, after a long period of use, the piezoresistor will gradually age, and leakage currents will gradually increase, destroying the thermal balance and leading to a constant rise in a product temperature. In order to prevent the piezoresistor from causing fire accidents by overheating, a thermal protection tripping device is usually arranged in the surge protector and configured to trip out welding between the piezoresistor and the circuit when the temperature rises, and after the piezoresistor and the circuit are tripped out, the surge protector fails, losing protection on the devices. The surge protector that fails is provided with a state indicator to prompt maintenance personnel to replace in time.

In some unattended occasions, a remote signaling device is usually designed on the base of the surge protector, to realize remote indication of a failure state of the surge protector.

At present, in one surge protector, two or more surge protecting modules are usually plugged into the base, and one remote signaling device needs to be arranged corresponding to each surge protecting module, which not only results in complex structure and large volume of the surge protecting module, but also has the problems of long production cycle and high cost.

SUMMARY

An objective of the present disclosure is to solve the problems of complex structure, large volume, long production cycle, high cost and the like of current surge protectors.

In order to realize the above objective, the present disclosure provides a linkage mechanism, and the linkage mechanism includes a linkage swing rod and transmission components;

the linkage swing rod is arranged to be rotatably connected, and is provided with a trigger portion capable of triggering a switch when rotating and at least two stress portions arranged spaced apart from each other on one side of an axis of rotation of the linkage swing rod; and one transmission component is arranged corresponding to each of the stress portions, and the transmission components are arranged in such a way that any of the transmission components applies a pushing force to the stress portion to rotate the linkage swing rod, and thus the trigger portion triggers the switch.

Preferably, the trigger portion and the stress portions are arranged on two opposite sides of the linkage swing rod respectively.

Preferably, each transmission component includes a transmission body member and a spring connected to the transmission body member; and the transmission body member is arranged in such a way that the transmission body member does not apply the pushing force to the linkage swing rod when being restricted by a pressure action and the spring is pressed by the transmission body member to be in a contraction state, and when the transmission body member is released from the pressure action, the spring pushes the transmission body member to move by means of an elastic force, and the transmission body member moves to apply the pushing force to the stress portion of the linkage swing rod so as to push the linkage swing rod to rotate.

Preferably, transmission body member includes:

an intermediate portion, arranged for pushing the stress portion of the linkage swing rod;

a first post, located on one side of the intermediate portion facing the stress portion, and arranged for bearing pressure in a direction facing away from the stress portion; and a second post, arranged on one side of the intermediate portion facing away from the stress portion, and sleeved with the spring.

According to another aspect of the present disclosure, a base for a surge protecting device is further provided, and the base is provided with plugging holes for plugging of pins of a surge protecting module, and further includes a remote signaling mechanism configured to indicate a working state of the surge protecting module, wherein the remote signaling mechanism includes a microswitch and the linkage mechanism described above, the surge protecting module is arranged to be linked with a transmission body member of the linkage mechanism, and when the surge protecting module is in a failure state, the transmission body member of the linkage mechanism pushes a linkage swing rod to rotate under an action of an elastic force of a spring, the linkage swing rod triggers the microswitch, and the microswitch sends out a signal indicating failure of the surge protecting module.

Preferably, the base is further provided with a remote signaling terminal block and a remote signaling connection terminal configured to be connected to the remote signaling terminal block, wherein the remote signaling terminal block is connected to the microswitch, to remotely transmit a signal sent out from the microswitch by means of the remote signaling terminal block and the remote signaling connection terminal.

According to yet another aspect of the present disclosure, a surge protecting device is further provided, the surge protecting device includes at least two surge protecting modules and the base described above, each surge protecting module is plugged into plugging holes of the base by means of pins, and each transmission body member on the base corresponds to one surge protecting module; and when one of the surge protecting modules is in a failure state, the transmission body member corresponding to the surge protecting module pushes the linkage swing rod to rotate, and the linkage swing rod triggers the microswitch.

Preferably, each surge protecting module includes a carrier frame, a piezoresistor mounted on a first side of the carrier frame, and an electrode connector mounted on a second side of the carrier frame, the piezoresistor is provided with a first electrode and a second electrode, the first electrode is provided with a first pin for plugging, the second electrode is welded to the electrode connector through an electrode via hole in the carrier frame, and the electrode connector is provided with a second pin for plugging;

the surge protecting module further includes a tripping mechanism, the tripping mechanism includes a rotating body and a potential storage spring, the rotating body is rotatably mounted on the second side of the carrier frame, wherein when the electrode connector and the second electrode are in a welded state, the rotating body is restricted at a first position, and the potential storage spring is arranged between the rotating body and the carrier frame and is in a compressed or extended potential storage state, when a solder between the electrode connector and the second electrode melts, the potential storage spring drives the rotating body by an elastic force to rotate to a second position, and at the second position, the rotating body rotates to block off connection between the electrode connector and the second electrode;

a limiting surface is formed on the rotating body, and when the rotating body is at the first position, the limiting surface of the rotating body presses on the transmission body member in the base so that the transmission body member is in a pressed state, a spring on the transmission body member is compressed between the transmission body member and the base, and the microswitch sends out a first state signal; and when the rotating body rotates to the second position, the transmission body member is released from pressure of the rotating body, the transmission body member moves under the action of an elastic force of the spring, the transmission body member pushes a corresponding stress portion to rotate the linkage swing rod, a trigger portion triggers the microswitch when rotating, and the microswitch sends out a second state signal.

In the technical solutions provided in the present disclosure, a module failure signal can be sent out when any surge protecting module fails under the condition where only one microswitch is arranged, and there is no need to provide one microswitch corresponding to each surge protecting module, which not only simplifies the structure of the surge protecting device and reduces the volume, but also reduces the cost.

Other features and advantages of the present disclosure will be described in detail in the subsequent sections on specific embodiments.

BRIEF DESCRIPTION OF FIGURES

Accompanying drawings, which constitute a part of the present disclosure, are used to provide a further understanding of the present disclosure, and the schematic embodiments of the present disclosure and their description are used to explain the present disclosure and do not constitute an undue limitation to the present disclosure. In the accompanying drawings.

REFERENCE NUMERALS

Figure 1:
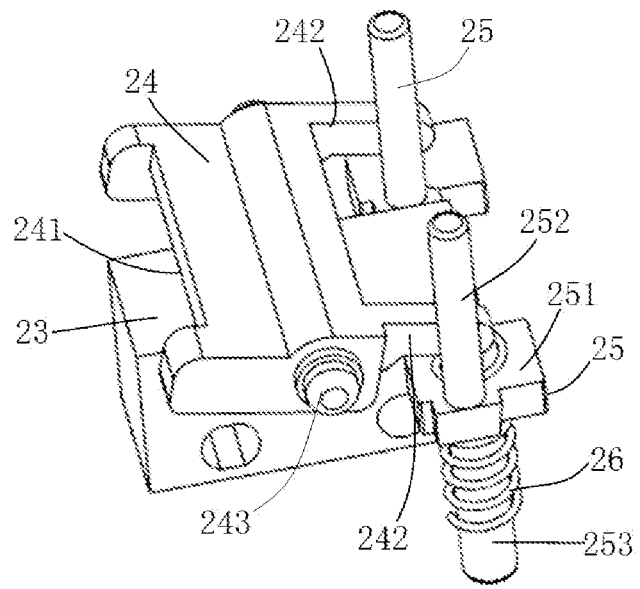
FIG. 1 is a schematic structural diagram of a linkage mechanism having two stress portions according to one embodiment of the present disclosure.

1—surge protecting module; 11—housing; 111—state display hole; 12—carrier frame; 121—electrode via hole; 122—rotary shaft; 123—first spring connection portion; 124—first state indicating portion; 125—positioning column; 126—via hole; 127—first support portion; 128—second support portion; 13—piezoresistor; 131—first electrode; 1311—first pin; 132—second electrode; 1321—welding portion; 14—electrode connector; 141—second pin; 142—welding end; 143—positioning groove; 15—rotating body; 151—limiting surface; 152—second state indicating portion; 154—arc-isolating plate; 155—second spring connection portion; 16—potential storage spring; 2—base; 21—upper cover; 211—open hole; 212—wiring hole; 22—mounting body; 23—microswitch; 24—linkage swing rod; 241—trigger portion; 242—stress portion; 243—rotary shaft; 25—transmission body member; 251—intermediate portion; 252—first post; 253—second post; 26—spring; 27—first wiring board; 28—second wiring board; 29—line frame; 3—remote signaling terminal block; and 4—remote signaling connection terminal.

DETAILED DESCRIPTION

Example embodiments are described more comprehensive with reference to the accompanying drawings now. However, the example embodiments are capable of being implemented in a variety of forms and should not be construed as being limited to the examples set forth herein; rather, the provision of these embodiments allows the present disclosure to be more comprehensive and complete and the idea of the example embodiments is conveyed comprehensively to those skilled in the art. The accompanying drawings are only schematic illustrations of the present disclosure and are not necessarily to scale. Identical reference numerals in the drawings indicate identical or similar portions, and thus repetitive descriptions thereof will be omitted.

In addition, the described features, structures, or characteristics may be combined in one or more embodiments in any suitable manner. In the following description, many specific details are provided, thereby giving a full understanding of the embodiments of the present disclosure. However, those skilled in the art will realize that it is possible to practice the technical solutions of the present disclosure and omit one or more of the specific details described, or that other methods, components, devices, steps, and the like may be employed. In other cases, the publicly known structures, methods, devices, implementations, materials, or operations are not shown or described in detail to avoid being overly focused and obscuring aspects of the present disclosure.

For ease of illustration, spatial terms such as "above", "below", "left", "right", etc. may be used hereinto illustrate a relationship of one element or feature illustrated in the drawings relative to another element or feature. It should be understood that spatial terms are intended to include different orientations of the device in use or operation in addition to the orientation illustrated in the drawings. For example, if the device in the drawings is inverted, an element that is described as being "below" another element or feature would be positioned "above" the other element or feature. Thus, the exemplary term "under" may contain both above and below orientations. The device may also be positioned in other ways, such as rotated by 90 degrees or in other orientations, and the spatial relative descriptions used herein may be interpreted accordingly.

Figure 2:
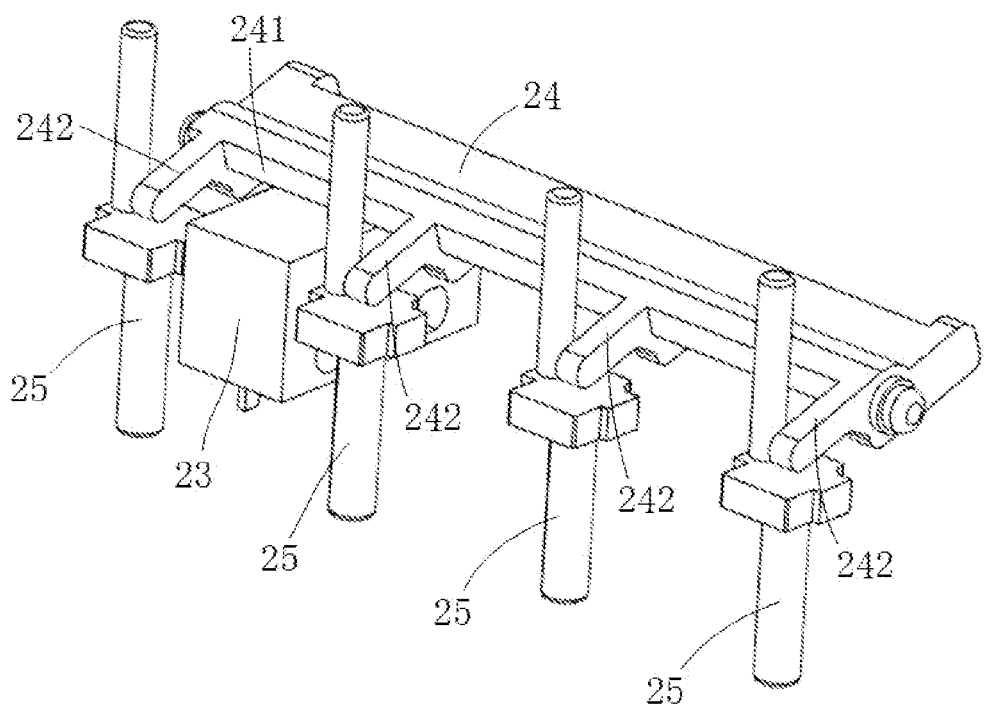
FIG. 2 is a schematic structural diagram of a linkage mechanism having four stress portions according to another embodiment of the present disclosure.

The present disclosure provides a linkage mechanism. As shown in FIG. 1 and FIG. 2, the linkage mechanism includes a linkage swing rod 24 and transmission components.

The linkage swing rod 24 is arranged to be rotatably connected, and as shown in FIG. 1, the linkage swing rod 24 is provided with a rotary shaft 243, and may be rotatably connected to other structures by means of the rotary shaft 243. The linkage swing rod 24 is provided with a trigger portion 241 capable of triggering a switch when rotating and at least two stress portions 242 arranged spaced apart from each other on one side of an axis of rotation of the linkage swing rod 24.

One transmission component is arranged corresponding to each of the stress portions 242, and the transmission components are arranged in such a way that any of the transmission components applies a pushing force to the stress portion 242 to rotate the linkage swing rod 24, and thus the trigger portion 241 triggers the switch. FIG. 1 shows that the linkage swing rod 24 is provided with two stress portions 242, FIG. 2 shows that the linkage swing rod 24 is provided with four stress portions 242, of course, stress portions of other quantities may also be arranged, and one transmission component is arranged corresponding to each stress portion 242.

The linkage swing rod provided by the present disclosure is suitable for use in a remote signaling mechanism of a surge protecting device, when at least two surge protecting modules 1 are mounted on a base 2 of the surge protecting device, in case of failure of any one of the surge protecting modules (i.e., disconnection of a piezoresistor in the surge protecting module from a circuit), a tripping mechanism in the surge protecting module 1 is actuated, the actuation of the tripping mechanism is transmitted to the transmission component corresponding to the surge protecting module 1, the transmission component pushes the corresponding stress portion 242 of the linkage swing rod 24, and thus the linkage swing rod 24 rotates to trigger the switch (usually a microswitch), and a failure signal of the surge protecting module is sent out.

That is, the linkage mechanism provided by the present disclosure is arranged in the surge protecting device, the module failure signal can be sent out when any surge protecting module fails under the condition where only one microswitch is arranged, and there is no need to provide one microswitch corresponding to each surge protecting module, which not only simplifies the structure of the surge protecting device and reduces the volume, but also reduces the cost.

Preferably, the trigger portion 241 and the stress portions 242 are arranged on two opposite sides of the linkage swing rod 24 respectively. When the stress portions 242 turn over in one direction (e.g., upwards), the trigger portion 241 turns over in an opposite direction (e.g., downwards), so that the trigger portion 241 triggers the switch.

In a preferred embodiment, each transmission component includes a transmission body member 25 and a spring 26 connected to the transmission body member 25; and the transmission body member 25 is arranged in such a way that when being restricted by a pressure action, for example, when downward pressure is applied to the transmission body member 25 in FIG. 1 and FIG. 2, the transmission body member 25 does not apply a pushing force to the linkage swing rod 24 and the spring 26 is pressed by the transmission body member 25 to be in a contraction state, and when the transmission body member 25 is released from the pressure action, the spring 26 pushes the transmission body member 25 to move (moving upwards in FIG. 1 and FIG. 2) by means of an elastic force, and the transmission body member 25 moves to apply the pushing force to the stress portion 242 of the linkage swing rod 24 so as to push the linkage swing rod 24 to rotate.

Preferably, each transmission body member 25 includes:
an intermediate portion 251, arranged for pushing the stress portion 242 of the linkage swing rod 24;
a first post 252, located on one side of the intermediate portion 251 facing the stress portion, and arranged for bearing pressure in a direction facing away from the stress portion 242; and
a second post 253, arranged on the other side of the intermediate portion 251, and sleeved with the spring 26.

In this way, when pressure in a direction facing away from the stress portion 242 is applied to the first post 252, the intermediate portion 251 is released from the stress portion 242 of the linkage swing rod 24 and avoids pushing the linkage swing rod 24 to rotate, and at the same time, the spring 26 with which the second post 253 is sleeved is pressed by the intermediate portion 251 to be contractive.

After the pressure applied to the first post 252 disappears, the intermediate portion 251 moves towards the stress portion 242 under the action of elastic force of the spring 26, so that the intermediate portion 251 pushes the corresponding stress portion 251, and the linkage swing rod 24 rotates.

According to another aspect of the present disclosure, a base 2 for a surge protecting device is further provided, and the base 2 is provided with plugging holes for plugging of pins of a surge protecting module 1, and further includes a remote signaling mechanism configured to indicate a working state of the surge protecting module 1.

Figure 3:
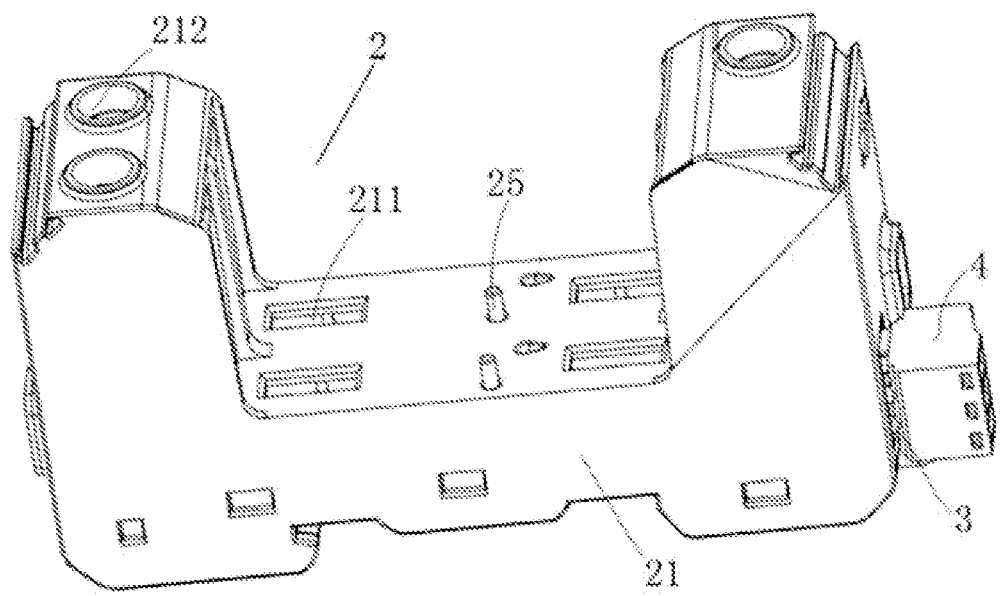
FIG. 3 is a schematic structural diagram of a base of a surge protecting device according to one embodiment of the present disclosure.
Figure 4:
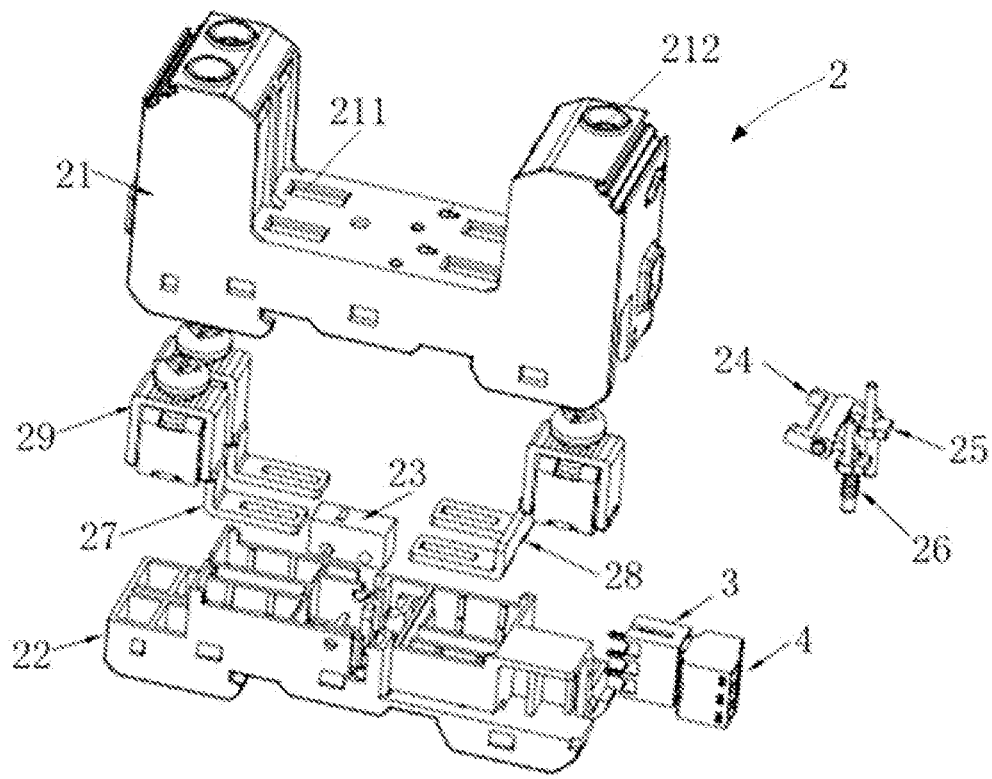
FIG. 4 is a schematic diagram of a base in a separated state.
Figure 5:
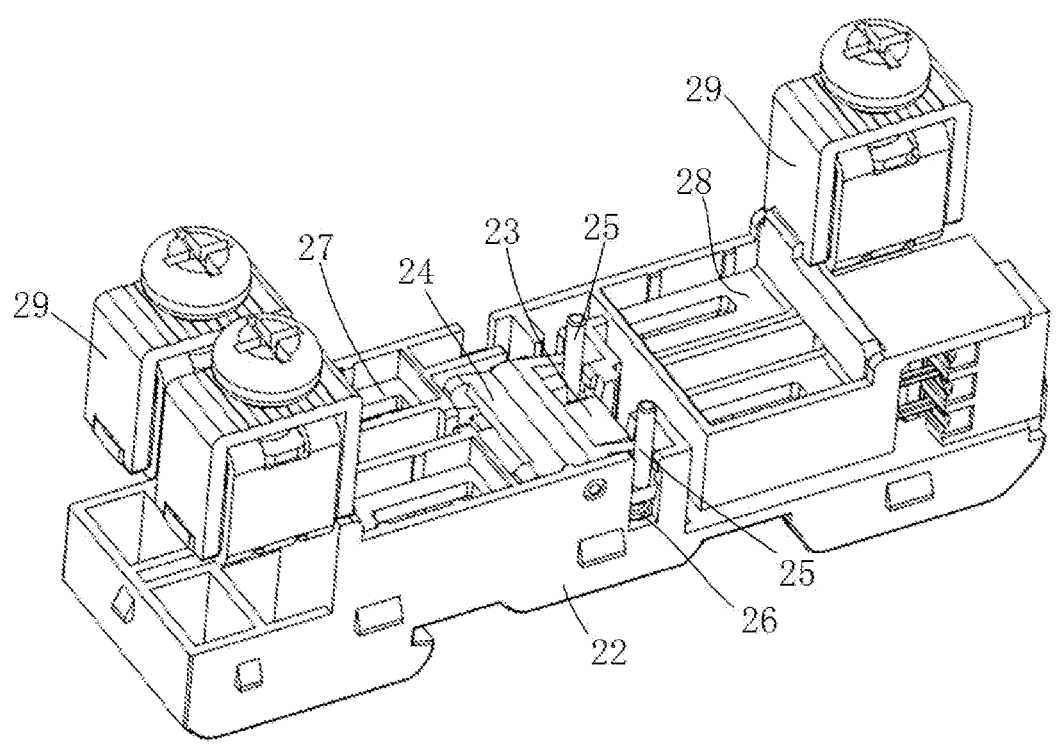
FIG. 5 is a schematic diagram of a remote signaling mechanism mounted in a base.
Figure 6:
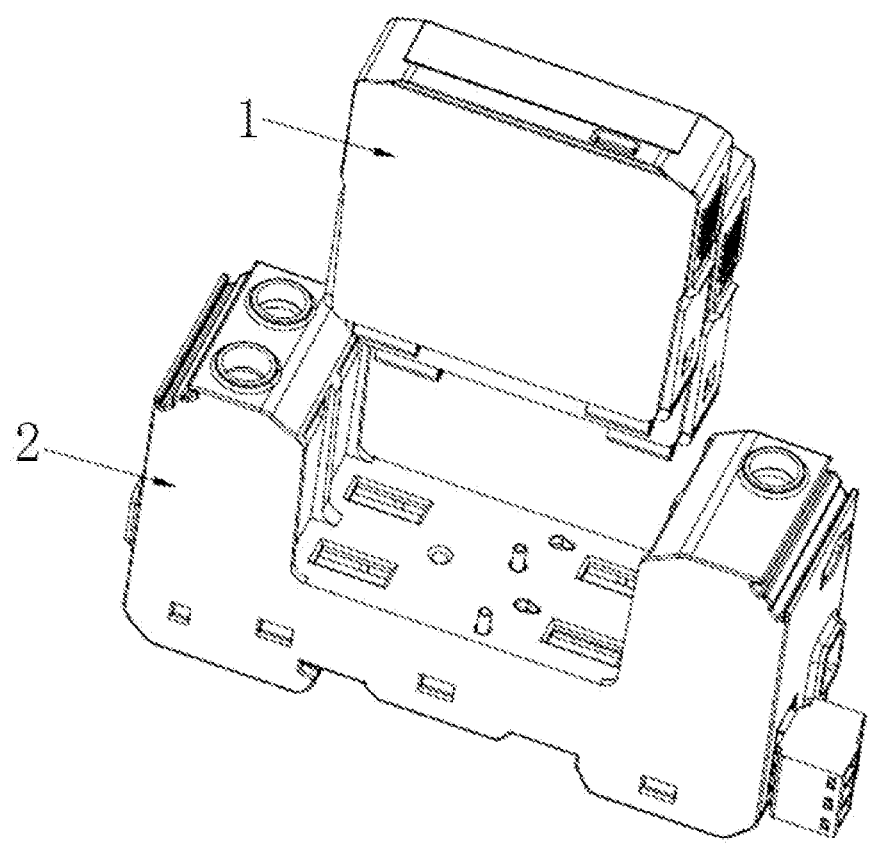
FIG. 6 is a schematic diagram of plugging of two surge protecting modules with a base.
Figure 7:
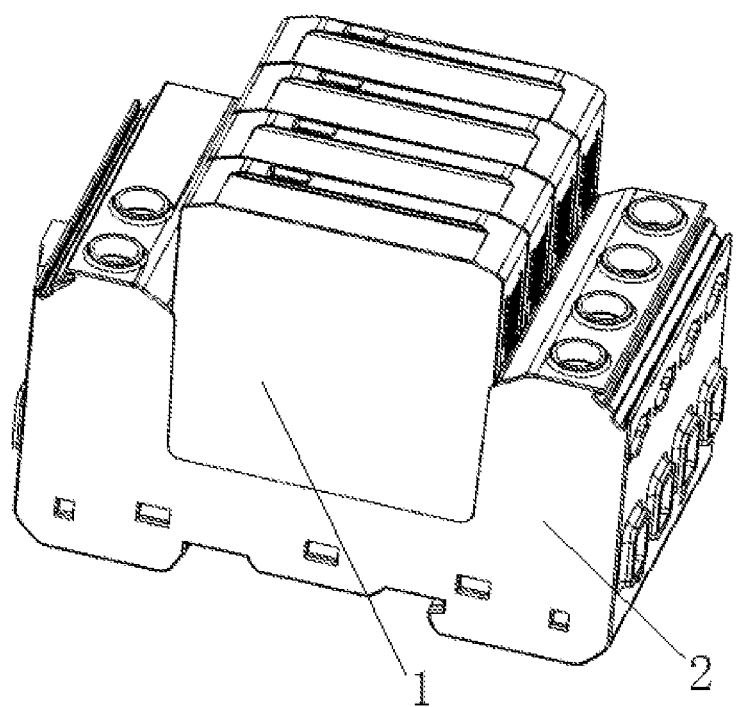
FIG. 7 is a schematic diagram of plugging of four surge protecting modules with a base.
Figure 8:
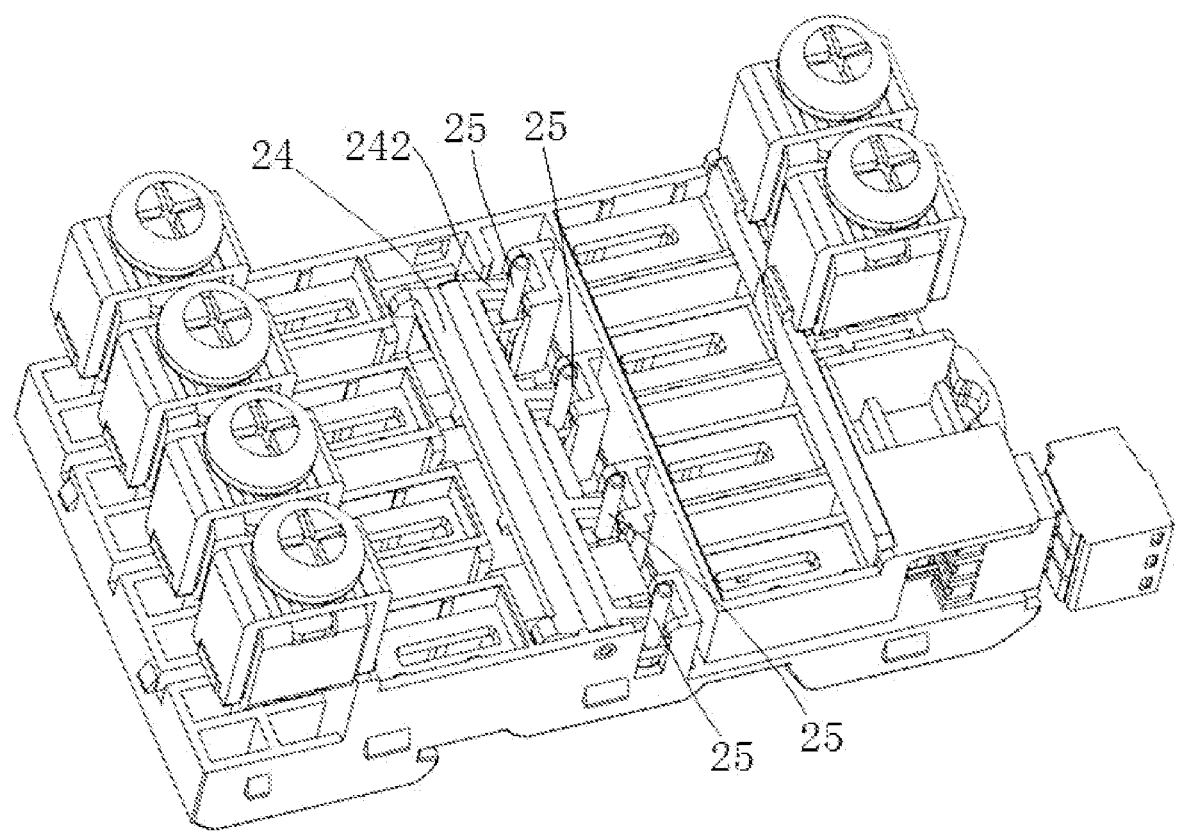
FIG. 8 is a schematic diagram of a remote signaling mechanism mounted in the base shown in FIG. 7.

FIG. 3 and FIG. 4 are schematic structural diagrams of the base 2; FIG. 6 is a schematic diagram of plugging two surge protecting modules 1 into the base 2; FIG. 5 and FIG. 8 are schematic diagrams of a remote signaling mechanism mounted on the base; and FIG. 7 is a schematic diagram of plugging four surge protecting modules into the base 2.

As shown in FIG. 4 and FIG. 5, the remote signaling mechanism includes a microswitch 23 and the linkage mechanism described above, the surge protecting modules 1 are arranged to be linked with the transmission body members 25 of the linkage mechanism, and when one of the surge protecting modules 1 is in a failure state, the transmission body member 25 corresponding thereto pushes the linkage swing rod 24 to rotate under the action of the elastic force of the spring 26, the linkage swing rod 24 triggers the microswitch 23, and the microswitch 23 sends out a signal indicating failure of the surge protecting device.

Specifically, the base 2 includes a mounting body 22 and an upper cover 21 covering the mounting body 22, and the upper cover 21 may be fixed to the mounting body 22 in a clamping manner or other manners. The mounting body 22 is provided with a first wiring board 27 and a second wiring board 28, the mounting body 22 may be provided with limiting grooves to limit the first wiring board 27 and the second wiring board 28, the first wiring board 27 and the second wiring board 28 are respectively provided with plugging holes for plugging of two pins of each surge protecting module 1, the upper cover 21 is provided with open holes 211 corresponding to jacks in the first wiring board 27 and the second wiring board 28, the jacks in the first wiring board 27 and the second wiring board 28 and the corresponding open holes 211 in the upper cover 21 form the plugging holes for plugging of the pins of the surge protecting modules 1, the first wiring board 27 and the second wiring board 28 are electrically connected to a line through line frames 29 and bolts arranged thereon, and the line specifically may be electrically connected to the first wiring board 27 and the second wiring board 28 via wiring holes 212 in the upper part of the base 2.

As shown in FIG. 5, the microswitch 23 in the remote signaling mechanism is fixedly mounted on the mounting body 22 of the base 2; and the linkage pendulum 24 is rotatably mounted on the mounting body 22 by means of a rotary shaft 243, the trigger portion 241 of the linkage swing rod 24 corresponds to the microswitch 23, one transmission body member 25 is arranged corresponding to each stress portion 242 of the linkage swing rod 24, and a spring 26 is arranged between each transmission body member 25 and the mounting body 22. The connection of the transmission body members 25 and the springs 26 is shown in FIG. 1, and first posts 252 of the transmission body members 25 extend upwards out of a housing 21 of the base 2 (as shown in FIG. 3), so that when the surge protecting modules 1 are mounted on the base 1, tripping mechanisms in the surge protecting modules 1 may apply pressure to the first posts 252, and when one surge protecting module 1 fails and the tripping mechanism changes the state, the pressure acting on the transmission body member 25 disappears, the transmission body member 25 moves upwards under the action of the elastic force of the spring 26, so that the intermediate portion 251 on the transmission body member 25 pushes upwards the stress portion 242 of the linkage swing rod 24, the linkage swing rod 24 rotates and causes the trigger portion 241 to trigger the microswitch 23, and the failure signal of the surge protecting module 1 is sent out. Regardless of how many surge protecting modules 1 are arranged on the base 1, when any one of the surge protecting modules 1 fails, the linkage swing rod 24 will trigger the microswitch 23.

The linkage swing rod 24 mounted on the base in FIG. 5 corresponds to two transmission body members 25, and the linkage swing rod 24 mounted on the base in FIG. 8 corresponds to four transmission body members 25.

In this embodiment, the base 2 is further provided with a remote signaling terminal block 3 and a remote signaling connection terminal 4 configured to be connected to the remote signaling terminal block 3, wherein the remote signaling terminal block 3 is connected to the microswitch 23, to remotely transmit the signal sent out from the microswitch 23 by means of the remote signaling terminal block 3 and the remote signaling connection terminal 4.

According to yet another aspect of the present disclosure, a surge protecting device is further provided, and the surge protecting device includes surge protecting modules 1 and the base 2 described above;

each surge protecting module 1 is plugged into the plugging holes of the base 2 by means of pins, and each transmission body member 25 on the base 2 corresponds to one surge protecting module 1; and when one of the surge protecting modules 1 is in a failure state, the transmission body member 25 corresponding to the surge protecting module 1 pushes the linkage swing rod 24 to rotate, and the linkage swing rod 24 triggers the microswitch 23.

Figure 9:
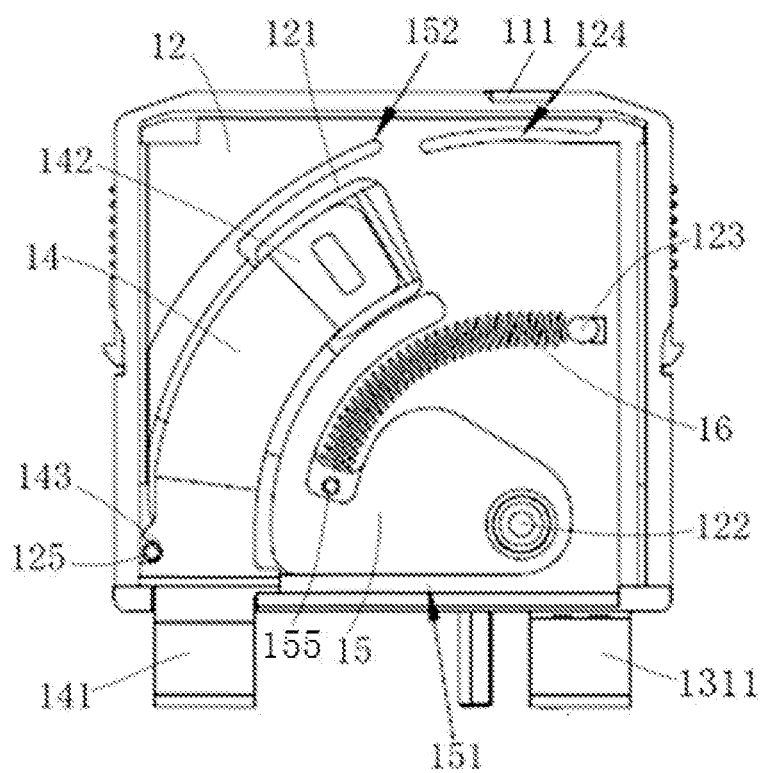
FIG. 9 is a schematic structural diagram of an interior of a surge protecting module (a tripping mechanism is in a first state).
Figure 10:
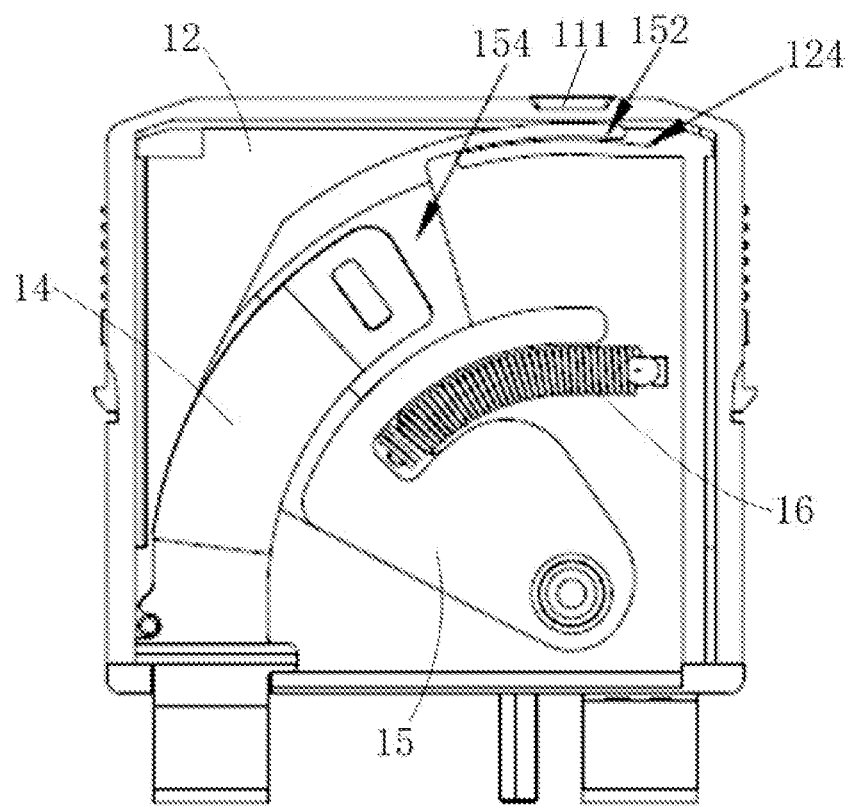
FIG. 10 is a schematic structural diagram of an interior of a surge protecting module (a tripping mechanism is in a second state).
Figure 11:
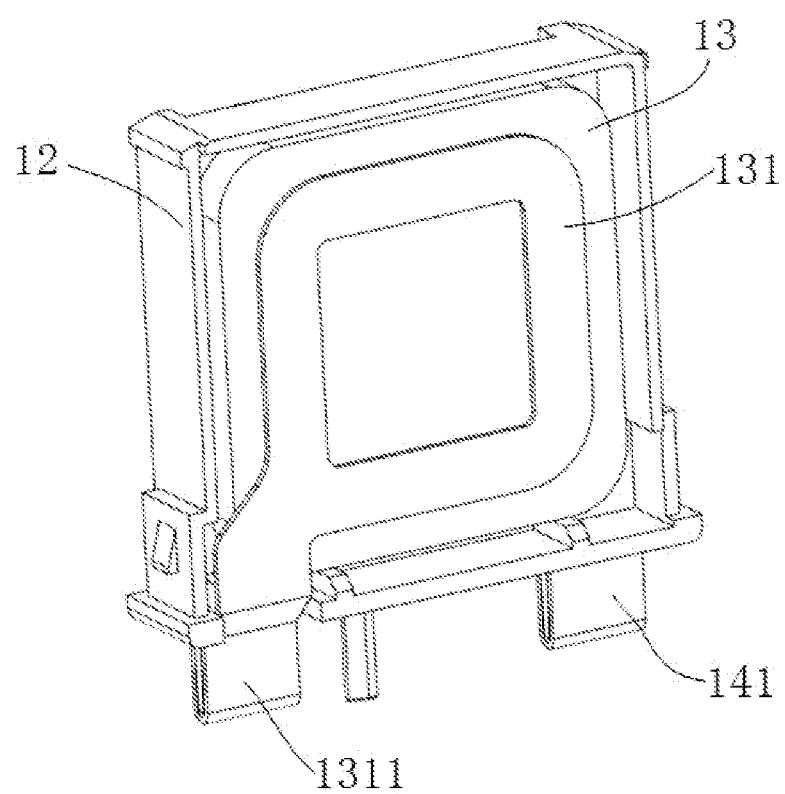
FIG. 11 is a schematic diagram of a piezoresistor mounted on a carrier frame.
Figure 12:
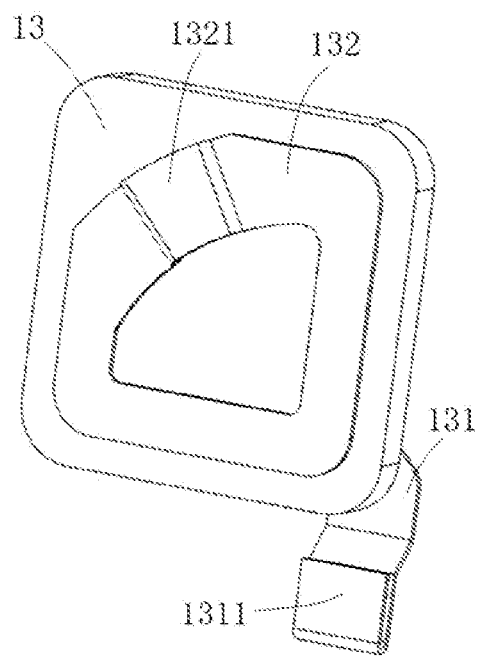
FIG. 12 is a schematic structural diagram of a piezoresistor as viewed from one side.
Figure 13:
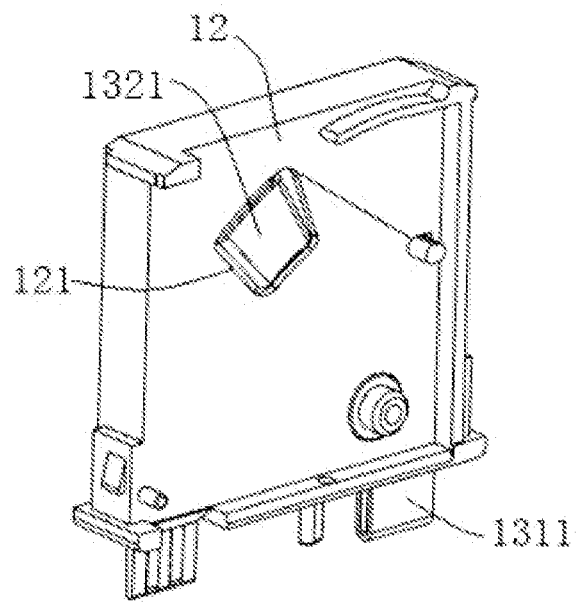
FIG. 13 is a schematic diagram of a second electrode of a piezoresistor at an electrode via hole of a carrier frame.

Specifically, as shown in FIG. 9 and FIG. 10, each surge protecting module 1 includes a carrier frame 12, a piezoresistor 13 mounted on a first side of the carrier frame 12, and an electrode connector 14 mounted on a second side of the carrier frame 12. The piezoresistor 13 is provided with a first electrode 131 and a second electrode 132, the structure of the piezoresistor 13 is shown in FIG. 11 and FIG. 12, the first electrode 131 is provided with a first pin 1311 for plugging, and the second electrode 132 is welded to the electrode connector 14 through an electrode via hole 121 in the carrier frame 12. The second electrode 132 is provided with a welding portion 1321 protruding towards the electrode via hole 121 (referring to FIGS. 12 and 13), a welding end 142 of the electrode connector 14 is welded to the welding portion 1321, the electrode connector 14 is positioned on the carrier frame 12 by means of cooperation between a positioning groove 143 in the electrode connector 14 and a positioning column 125 on the carrier frame 12, the electrode connector 14 is provided with a second pin 141 for plugging, and the first pin 1311 and the second pin 141 are configured to be plugged into the plugging holes of the base 2.

Each surge protecting module further includes a tripping mechanism, the tripping mechanism includes a rotating body 15 and a potential storage spring 16, the rotating body 15 is rotatably mounted on the second side of the carrier frame 12 through a rotary shaft 122, wherein when the electrode connector 14 and the second electrode 132 are in a welded state, the rotating body 15 is restricted at a first position, and the potential storage spring 16 is arranged between the rotating body 15 and the carrier frame 12 and is in a compressed or extended potential storage state, specifically, one end of the potential storage spring 16 is connected to a first spring connection portion 123 of the carrier frame 12, and the other end of the potential storage spring 16 is connected to a second spring connection portion 155 of the rotating body 15.

When a solder between the electrode connector 14 and the second electrode 132 melts, the potential storage spring 16 drives the rotating body 15 by an elastic force to rotate to a second position, and at the second position, the rotating body 15 rotates to block off connection between the electrode connector 14 and the second electrode 132. The rotating body 15 is provided with an arc-isolating plate 154, and at the second position, the arc-isolating plate 154 on the rotating body 15 is located exactly at the electrode via hole 121, realizing the function of arc extinguishing, and at the same time cutting off possible solder adhesion, so as to make tripping more reliable.

Figure 14:
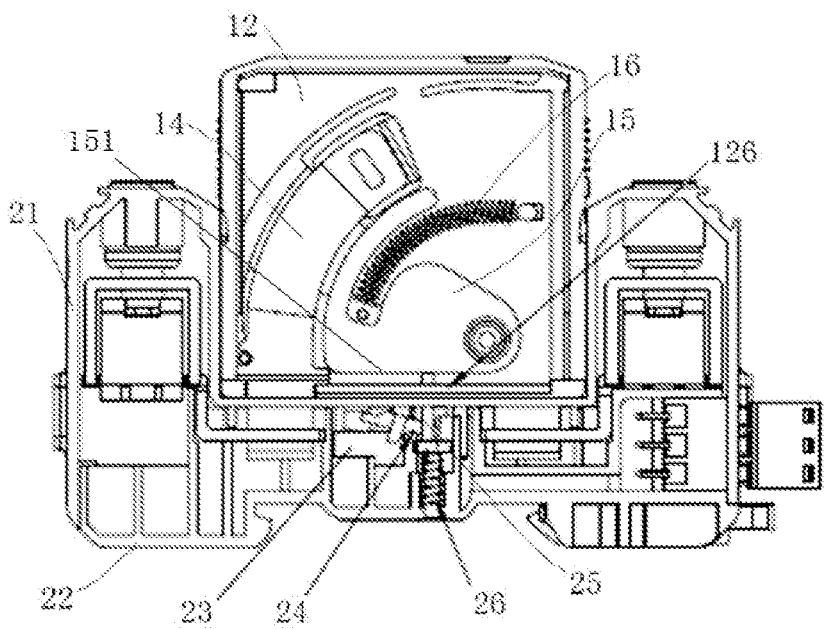
FIG. 14 is a schematic cross-sectional view of a surge protecting device (in a normal working state).

As shown in FIG. 14, a limiting surface 151 is formed on the rotating body 15, the first post 252 of the transmission body member 25 in the base 2 penetrates upwards out of the upper cover 21 of the base 2 and makes contact with the limiting surface 151 through a via hole 126 in the carrier frame 12, and when the rotating body 15 is at the first position, the limiting surface 151 of the rotating body 15 presses on the first post 252 of the transmission body member 25, so that the transmission body member 25 is in a pressed state, the spring 26 is compressed between the transmission body member 25 and the base 2, and the microswitch 23 sends out a first state signal.

Figure 15:
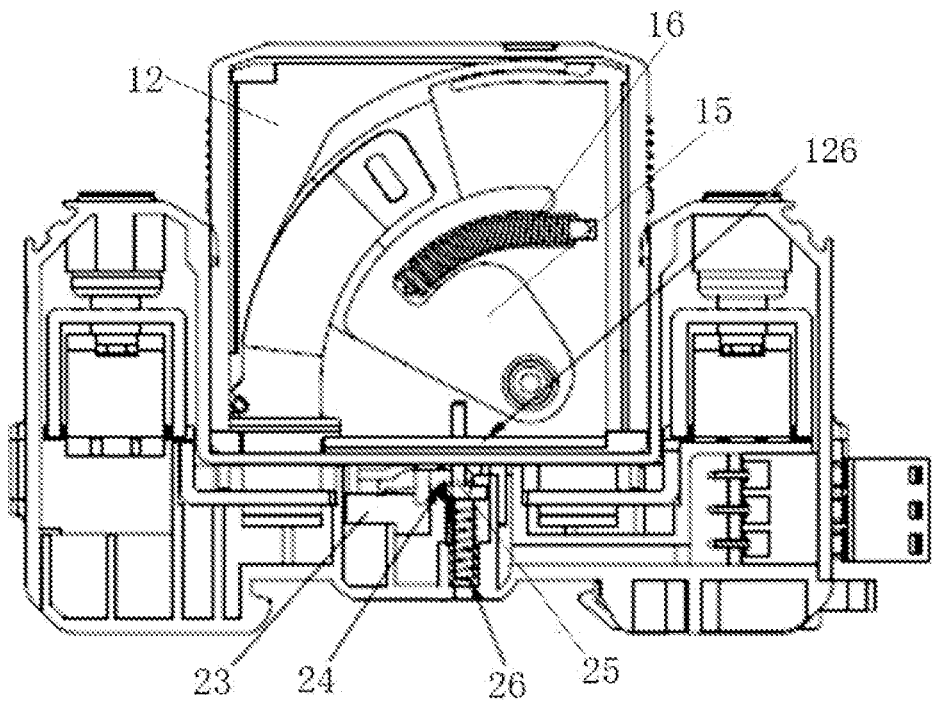
FIG. 15 is a schematic cross-sectional view of a surge protecting device (in a failure state).

As shown in FIG. 15, when the surge protecting module fails and the rotating body 15 rotates to the second position, the transmission body member 25 is released from pressure of the rotating body 15, the transmission body member 25 moves under the action of the elastic force of the spring 26, the transmission body member 15 pushes the corresponding stress portion 242 to rotate the linkage swing rod 24, the trigger portion 241 triggers the microswitch 23 when rotating, and the microswitch 23 sends out a second state signal.

Each surge protecting module 1 further includes a housing 11, as shown in FIG. 9 and FIG. 10, and the housing 11 is provided with a state display hole 111. The carrier frame 12 is provided with a first state indicating portion 124, and when the rotating body 15 is located at the first position, the state display hole 111 displays the first state indicating portion 124, indicating that the surge protecting module 1 is in a normal working state. The rotating body 15 is provided with a second state indicating portion 152, and when the rotating body 15 rotates to the second position, the state display hole 111 displays the second state indicating portion 152, indicating that the surge protecting module 1 is in a failure state.

It may be understood by those skilled in the art that the tripping mechanisms in the surge protecting modules 1 cooperating with the base 2 are not limited to the structural form as described above in the present embodiment, and other forms of tripping mechanisms capable of changing the state to isolate the electrode connector 14 from the second electrode 132 when the solder between the electrode connector 14 and the second electrode 132 melts are also possible. For example, a translation component that can be translated relative to the carrier frame 12 may be arranged, a spring is arranged between the translation component and the carrier frame 12, when the electrode connector 14 and the second electrode 132 are in a welded state, the translation component is restricted at the first position, and the spring is in a compressed or extended potential storage state, and when the solder melts, the translation component moves to a position between the electrode connector 14 and the welding portion of the second electrode 132 under the action of elastic force of the spring to perform isolation.

It may further be understood that the transmission components in the linkage mechanism linked with the surge protecting modules are also not limited to the structural form shown in FIG. 1, and any other structures in which the tripping mechanisms change the state to trigger the action of the transmission components, such that the transmission components push the linkage swing rod 24 are possible.

Preferred embodiments of the present disclosure are described in detail above in conjunction with the accompanying drawings, however, the present disclosure is not limited thereto. Within the scope of the technical conception of the present disclosure, a variety of simple modifications may be made to the technical solutions of the present disclosure, including the combination of individual specific technical features in any suitable manner. In order to avoid unnecessary repetition, the present disclosure does not separately describe the various possible combinations. However, these simple modifications and combinations should also be regarded as the disclosed contents of the present disclosure, and all belong to the scope of protection of the present disclosure.

What is claimed is:

1. A linkage mechanism, comprising a linkage swing rod and transmission components, wherein
   the linkage swing rod is arranged to be rotatably connected, and is provided with a trigger portion capable of triggering a switch when rotating and at least two stress portions arranged spaced apart from each other on one side of an axis of rotation of the linkage swing rod; and
   one transmission component is arranged corresponding to each of the stress portions, and the transmission components are arranged in such a way that any of the transmission components applies a pushing force to the stress portion to rotate the linkage swing rod, and thus the trigger portion triggers the switch,
   wherein each transmission component comprises a transmission body member and a spring connected to the transmission body member, and
   the transmission body member comprises: an intermediate portion, arranged for pushing the stress portion of the linkage swing rod; a first post, located on one side of the intermediate portion facing the stress portion, and arranged for bearing pressure in a direction facing away from the stress portion; and a second post, arranged on one side of the intermediate portion facing away from the stress portion, and sleeved with the spring.

2. The linkage mechanism according to claim 1, wherein the trigger portion and the stress portions are arranged on two opposite sides of the linkage swing rod respectively.

3. The linkage mechanism according to claim 1 or 2, wherein the transmission body member is arranged in such a way that the transmission body member does not apply the pushing force to the linkage swing rod when being restricted by a pressure action and the spring is pressed by the transmission body member to be in a contraction state, and when the transmission body member is released from the pressure action, the spring pushes the transmission body member to move by means of an elastic force, and the transmission body member moves to apply the pushing force to the stress portion of the linkage swing rod so as to push the linkage swing rod to rotate.

4. A base for a surge protecting device, provided with plugging holes for plugging of pins of a surge protecting module, and further comprising a remote signaling mechanism configured to indicate a working state of the surge protecting module, wherein the remote signaling mechanism comprises a microswitch and the linkage mechanism according to claim 3, the surge protecting module is arranged to be linked with the transmission body member of the linkage mechanism, and when the surge protecting module is in a failure state, the transmission body member of the linkage mechanism pushes a linkage swing rod to rotate under an action of an elastic force of a spring, the linkage swing rod triggers the microswitch, and the microswitch sends out a signal indicating failure of the surge protecting module.

5. The base according to claim 4, further provided with a remote signaling terminal block and a remote signaling connection terminal configured to be connected to the remote signaling terminal block, wherein the remote signaling terminal block is connected to the microswitch, to remotely transmit a signal sent out from the microswitch by means of the remote signaling terminal block and the remote signaling connection terminal.

6. A surge protecting device, comprising at least two surge protecting modules and the base according to claim 4 or 5, wherein each surge protecting module is plugged into plugging holes of the base by means of pins, and each transmission body member on the base corresponds to one surge protecting module; and when one of the surge protecting modules is in a failure state, the transmission body member corresponding to the surge protecting module pushes a linkage swing rod to rotate, and the linkage swing rod triggers a microswitch.

7. The surge protecting device according to claim 6, wherein each surge protecting module comprises a carrier frame, a piezoresistor mounted on a first side of the carrier frame, and an electrode connector mounted on a second side of the carrier frame, the piezoresistor is provided with a first electrode and a second electrode, the first electrode is provided with a first pin for plugging, the second electrode is welded to the electrode connector through an electrode via hole in the carrier frame, and the electrode connector is provided with a second pin for plugging;

the surge protecting module further comprises a tripping mechanism, the tripping mechanism comprises a rotating body and a potential storage spring, the rotating body is rotatably mounted on the second side of the carrier frame, wherein when the electrode connector and the second electrode are in a welded state, the rotating body is restricted at a first position and the potential storage spring is arranged between the rotating body and the carrier frame and is in a compressed or extended potential storage state, when a solder between the electrode connector and the second electrode melts, the potential storage spring drives the rotating body by an elastic force to rotate to a second position, and at the second position, the rotating body rotates to block off connection between the electrode connector and the second electrode;

a limiting surface is formed on the rotating body, and when the rotating body is at the first position, the limiting surface of the rotating body presses on the transmission body member in the base so that the transmission body member is in a pressed state, a spring on the transmission body member is compressed between the transmission body member and the base, and the microswitch sends out a first state signal; and when the rotating body rotates to the second position, the transmission body member is released from pressure of the rotating body, the transmission body member moves under an action of an elastic force of the spring, the transmission body member pushes a corresponding stress portion to rotate the linkage swing rod, a trigger portion triggers the microswitch when rotating, and the microswitch sends out a second state signal.

\* \* \* \* \*